United States Patent
Shu et al.

(10) Patent No.: US 6,912,344 B2
(45) Date of Patent: Jun. 28, 2005

(54) THERMO-OPTIC WAVE-GUIDE SWITCH

(75) Inventors: King-Chang Shu, Taipei (TW); Ding-Wei Huang, Taipei (TW); Tsung-Hsuan Chiu, Hsinchu (TW); Yinchieh Lai, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 134 days.

(21) Appl. No.: 10/138,313

(22) Filed: May 6, 2002

(65) Prior Publication Data
US 2003/0099421 A1 May 29, 2003

(30) Foreign Application Priority Data
Nov. 29, 2001 (TW) ........................................ 90129506 A

(51) Int. Cl.[7] ............................ G02F 1/295; G02B 6/26; G02B 6/10
(52) U.S. Cl. ............................ 385/41; 385/4; 385/39; 385/129
(58) Field of Search .......................... 385/4, 14, 16, 385/18, 39–42, 129–132, 17

(56) References Cited

U.S. PATENT DOCUMENTS

| | | | |
|---|---|---|---|
| 4,127,320 A | * 11/1978 | Li ................................ 385/9 |
| 4,753,505 A | * 6/1988 | Mikami et al. ................. 385/5 |
| 6,122,416 A | 9/2000 | Ooba et al. ................... 385/16 |
| 6,215,918 B1 | * 4/2001 | Keil et al. .................... 385/16 |
| 6,449,404 B1 | * 9/2002 | Paiam ........................ 385/16 |
| 6,470,125 B1 | * 10/2002 | Nashimoto et al. ......... 385/122 |
| 6,535,672 B1 | * 3/2003 | Paiam ......................... 385/50 |

* cited by examiner

*Primary Examiner*—Joseph Williams
*Assistant Examiner*—Peter Macchiarolo
(74) *Attorney, Agent, or Firm*—Birch, Stewart, Kolasch & Birch, LLP

(57) ABSTRACT

A thermo-optic wave-guide switch. The switch selectively switches the paths of an optical signal. The thermo-optic wave-guide switch includes a multi-mode wave-guide having an input port, a first output port and a second output port, and a thin film heater formed on the side of the multi-mode wave-guide. When the thin film heater does not provide the multi-mode wave-guide with heat and a signal is received by the input port, the first output port outputs the signal in a cross state according to the self-image theorem, and when the thin film heater provides the multi-mode wave-guide with heat and a signal is received by the input port, the second output port outputs the signal in a bar state.

7 Claims, 12 Drawing Sheets

20

THERMO-OPTIC WAVE-GUIDE SWITCH

BACKGROUND OF THE INVENTION

1. Field of the Invention

The invention relates to a thermo-optic wave-guide switch, and more particularly to a thermo-optic wave-guide switch triggered by heating a multi-mode wave-guide.

2. Description of the Related Art

FIG. 1A schematically shows a conventional optical switch. As shown in FIG. 1A, the conventional optical switch 10 has a Mach-Zehnder Interferometer 2 formed by a pair of optical wave-guides 1a, 1b and covered with a heater 3. When the heater 3 heats one of the optical wave-guides 1a, 1b, the output of the optical switch 10 is periodical. FIG. 1B schematically shows the periodic output of the conventional optical switch corresponding to different levels of output from the heater. As shown in FIG. 1B, the conventional optical switch 10 is an analog optical switch.

However, one disadvantage of the analog optical switch is that the output intensity thereof corresponding to the heat power is periodic and thus sensitive. In other words, the slight variation of the heat power of the heater causes huge variation of cross-talk. Furthermore, another disadvantage of the analog optical switch is susceptible to wavelength, and then the wavelength range applied to the analog optical switch is rather limited. Moreover, large volume analog optical switches have other disadvantage.

FIG. 2A schematically shows another conventional optical switch. As shown in FIG. 2A, another conventional optical switch 20 has a Y-type wave-guide 4, and the branches of the Y-type wave-guide 4 is covered with a heater 5. When the heater 5 selectively provides one branch of the Y-type wave-guide 4 with heat, the output port of the optical switch 20 is switched according to the mode-evolution theory. FIG. 2B schematically shows the output condition of the conventional optical switch corresponding to different levels of output from the heater. As shown in FIG. 2B, the conventional optical switch is a digital optical switch.

However, the disadvantage of the digital optical switch is that providing the branches of the Y-type wave-guide with huge index difference needs too much heat.

SUMMARY OF THE INVENTION

To solve the above problems, it is an object of the present invention to provide a thermo-optic wave-guide switch, wherein the thermo-optic wave-guide switch includes a multi-mode wave-guide and a thin film heater formed on one side of the multi-mode wave-guide. When a signal enters the input port of the multi-mode wave-guide and the multi-mode wave-guide is unheated, the signal is output from one output port of the thermo-optic wave-guide switch. When a signal enters the input port of the multi-mode wave-guide and the multi-mode wave-guide is heated by the thin film heater, the signal is output from another output port of the thermo-optic wave-guide switch.

A feature of the invention is that the thermo-optic wave-guide switch includes a multi-mode wave-guide and a thin film heater, wherein the thin film heater is formed on one side of the multi-mode wave-guide.

Another feature of the invention is that the multi-mode wave-guide is a straight structure.

Another feature of the invention is that the multi-mode wave-guide includes a first crooked portion having a first outer curve and a first inner curve and a second crooked portion having a second outer curve and a second inner curve, wherein the first outer curve connects the second inner curve and the first inner curve connects the second outer curve.

The invention has an advantage of extensive wavelength range for operating the thermo-optic wave-guide switch. The operating wavelength is ranged at least from 1530 nm to 1610 nm.

The invention has another advantage of extensive temperature range for operating the thermo-optic wave-guide switch. The operating temperature is ranged at least from −5° C. to 75° C.

The invention has a further advantage of decreasing the cross-talk value of the thermo-optic wave-guide switch to −40 dB.

The invention has the further advantage of providing a digital switch with relatively fast switch response. The switch response time is not greater than 6.5 ms.

The invention has the further advantage of decreasing the polarization-dependent-loss of the thermo-optic wave-guide switch, wherein the polarization-dependent-loss is not greater than 0.07 dB.

The invention has yet a further advantage of providing a thermo-optic wave-guide switch with small volume.

BRIEF DESCRIPTION OF THE DRAWINGS

This and other objects and features of the invention will become clear from the following description, taken in conjunction with the preferred embodiments with reference to the drawings, in which.

DETAILED DESCRIPTION OF THE PREFERRED EMBODIMENTS

First Embodiment

The optical switch of the invention utilizes a multimode interference (MMI) structure. The incident field is coupled into several waveguide modes when launched into the multimode region. For each waveguide mode, the coupling efficiency is proportional to the overlap integral field and incident filed. Each waveguide mode has different effective refractive index, i.e., each waveguide mode has different phase change while propagating the same path length. Under a certain length of propagation, every waveguide mode can have the same phase change and interference of all the modes, forming a mirror image of the incident field with respect to the center of the multimode waveguide. This phenomenon is called "self-image." Thus, a cross-state switch in an optical waveguide can be simply implemented, and the incident field launched from an input port thereof can be received by an output port in opposite position with respect to the center of the multimode waveguide.

Because effective refractive indices of conventional waveguide materials depend on operating temperatures thereof, a heater covering part of the multimode region can modify the distribution of refractive index of the multimode region. Simultaneously, multimode interference effect is changed, and self-image phenomenon is eliminated and no longer observed. The incident field keeps nearly the same field pattern along the multimode region and propagates into another output port on the opposite side of the heater, thus acting as a bar-state switch.

Figure 1A:
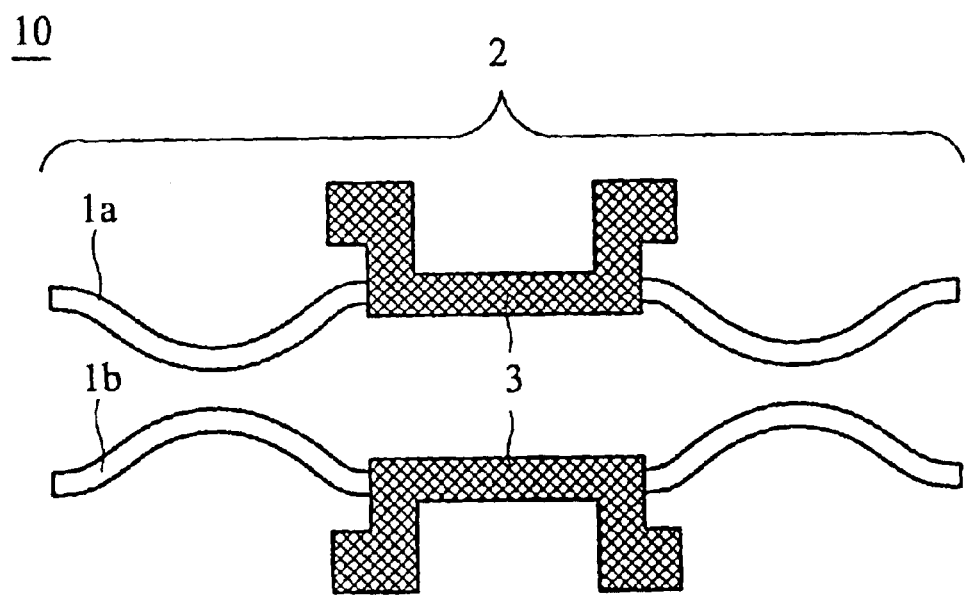
FIG. 1A schematically shows a conventional optical switch.
Figure 1B:
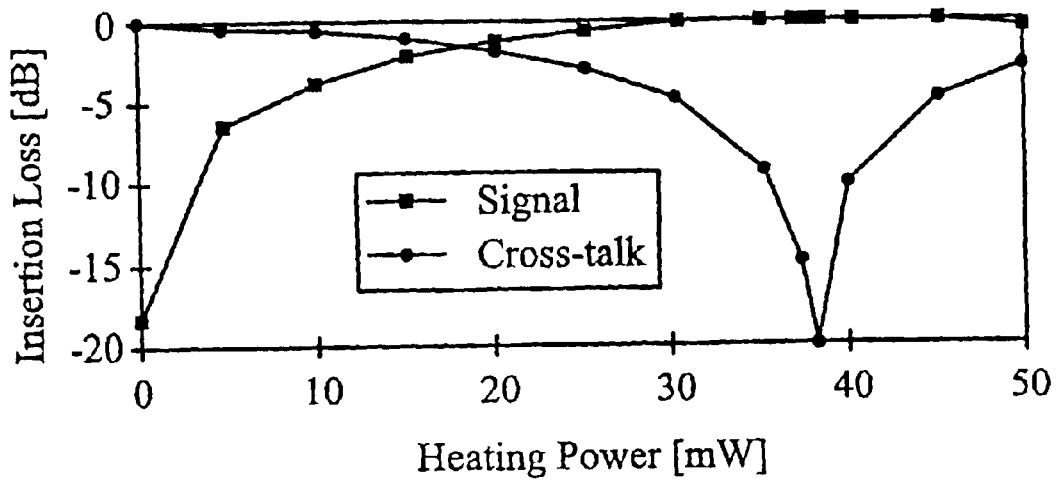
FIG. 1B schematically shows the periodic output of the conventional optical switch corresponding to different levels of output from the heater.
Figure 2A:
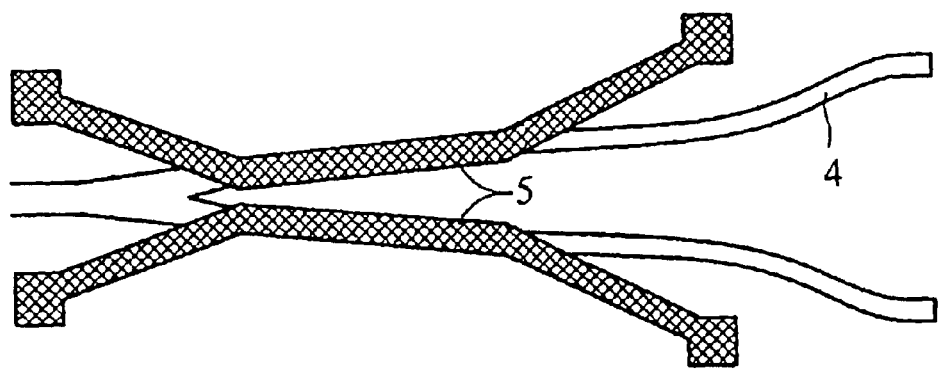
FIG. 2A schematically shows another conventional optical switch.
Figure 2B:
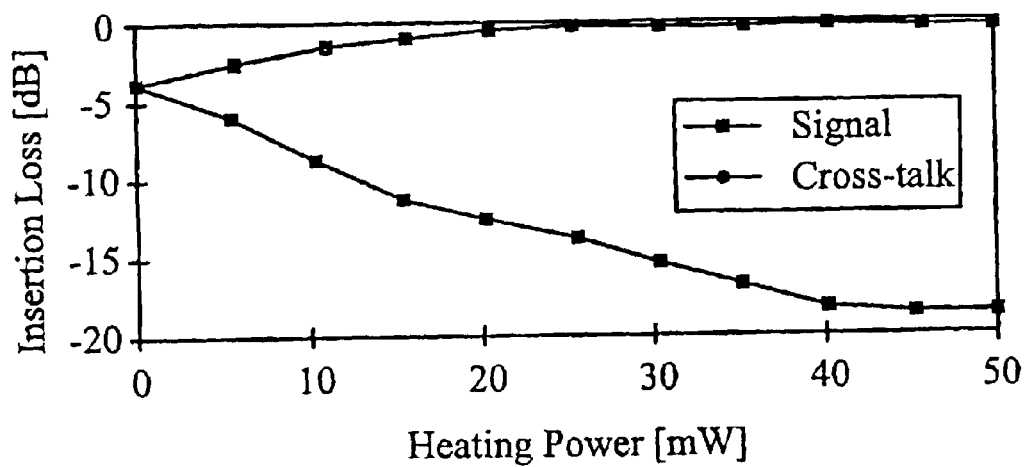
FIG. 2B schematically shows the output condition of the conventional optical switch corresponding to different levels of output from the heater.
Figure 3:
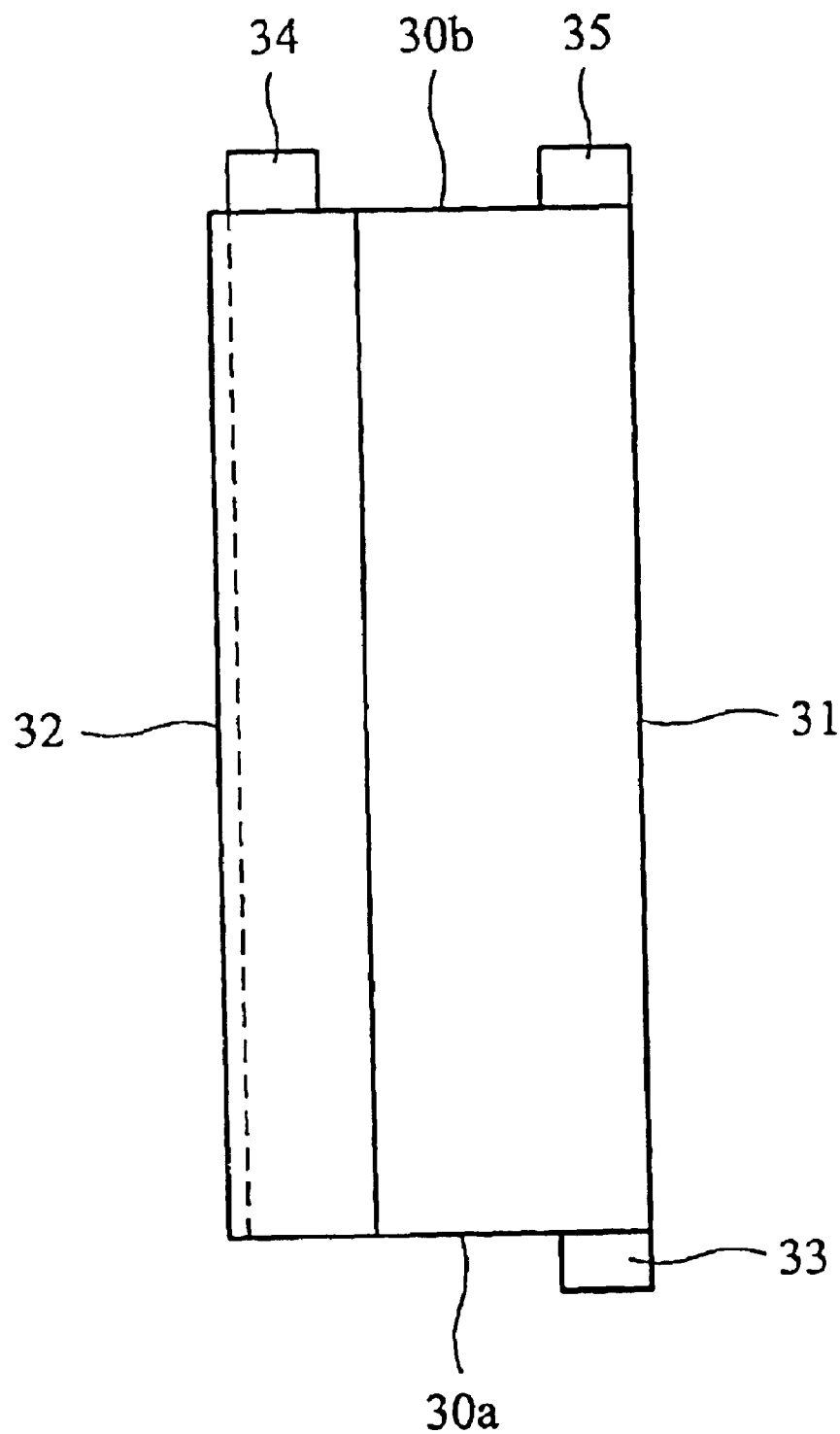
FIG. 3 schematically shows a thermo-optic wave-guide switch according to the first embodiment of the invention.

FIG. 3 schematically shows a thermo-optic wave-guide switch according to the first embodiment of the invention. As shown in FIG. 3, the thermo-optic wave-guide switch 30 of the first embodiment of the invention is a straight structure, and includes a multi-mode wave-guide 31 and a thin film heater 32 formed on one side of the multi-mode wave-guide 31. In the first embodiment of the invention, the multi-mode wave-guide 31 has a thermo-optic property such that when the temperature is increased, the index of the multi-mode wave-guide is decreased. The thermo-optic wave-guide switch 30 of the first embodiment of the invention has an input port 33, a first output port 34 and a second output port 35, wherein the input port 33 is located at one end 30a of the thermo-optic wave-guide switch 30, and the first output port 34 and the second output port 35 are located at the other end 30b thereof. According to the self-image theorem, the multi-mode wave-guide has a predetermined length of $4n_c W^2/\lambda_o$, wherein the $n_c$ is the index of the multi-mode wave-guide, W is the width of the multi-mode wave-guide, and $\lambda_o$ is the wavelength of the input signal.

Figure 4:
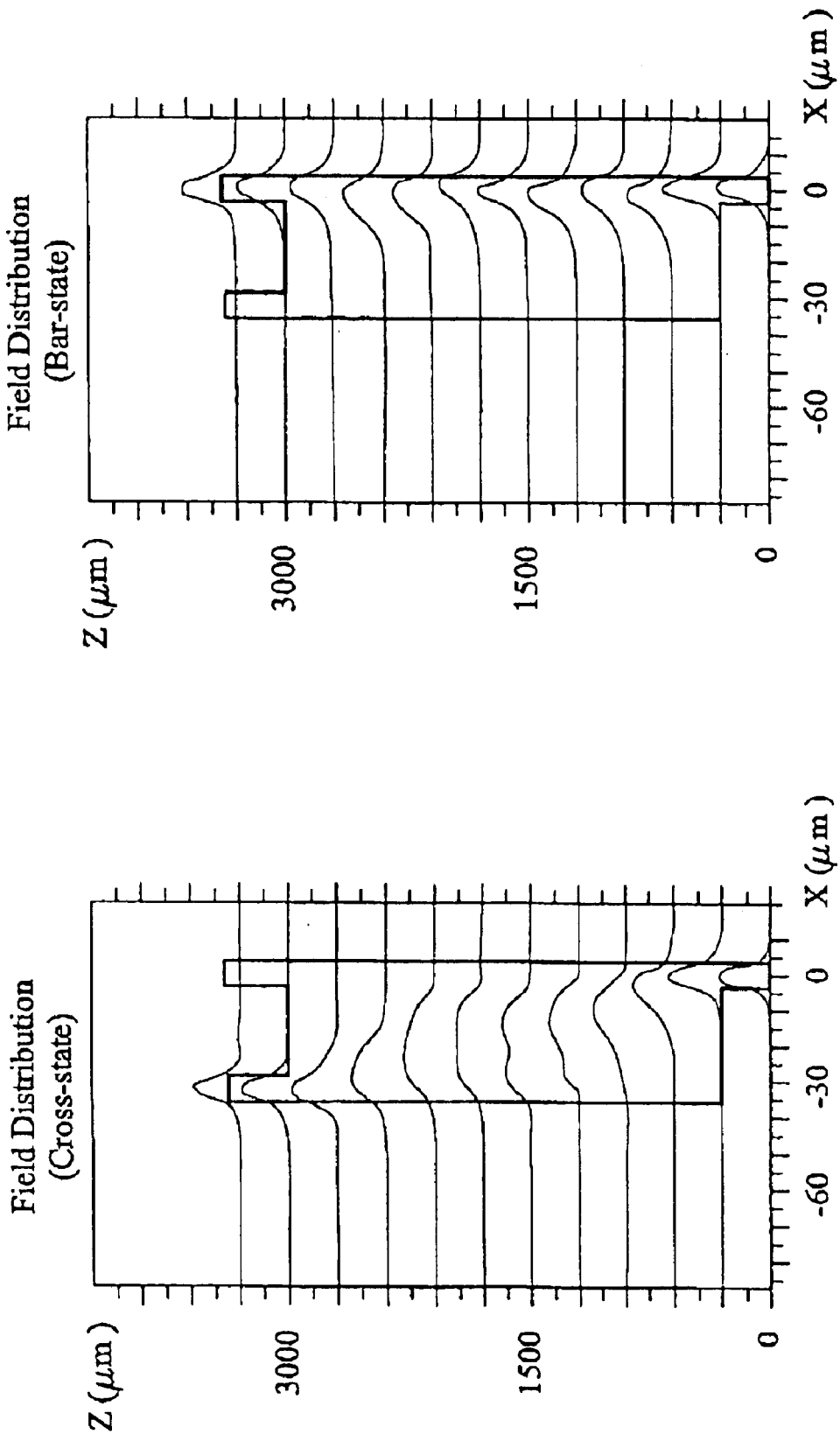
FIG. 4A schematically shows the first operation of the thermo-optic wave-guide switch, wherein the thermo-optic wave-guide switch is unheated by the thin film heater.
FIG. 4B schematically shows the second operation of the thermo-optic wave-guide switch, wherein the thermo-optic wave-guide switch is heated by the thin film heater.

FIG. 4A schematically shows the first operation of the thermo-optic wave-guide switch, wherein the thermo-optic wave-guide switch is unheated by the thin film heater. As shown in FIG. 4A, when the thin film heater does not heat the thermo-optic wave-guide switch and a signal Ψ with the wavelength $\lambda_o$ enters the input port, the first output port outputs the signal in a cross state.

FIG. 4B schematically shows the second operation of the thermo-optic wave-guide switch, wherein the thermo-optic wave-guide switch is heated by the thin film heater. As shown in FIG. 4B, when the thin film heater heats the thermo-optic wave-guide switch and a signal Ψ with the wavelength $\lambda_0$ enters the input port, the second output port outputs the signal in a bar state.

In conclusion, when the input port, the first output port and the second output port of the thermo-optic wave-guide switch respectively connect with three single-mode wave-guides, the multi-mode wave-guide switch controls the optical path of the signal by the thin film heater. Thus, the thermo-optic wave-guide switch selectively switches the optical path of the signal.

Second Embodiment

Figure 5:
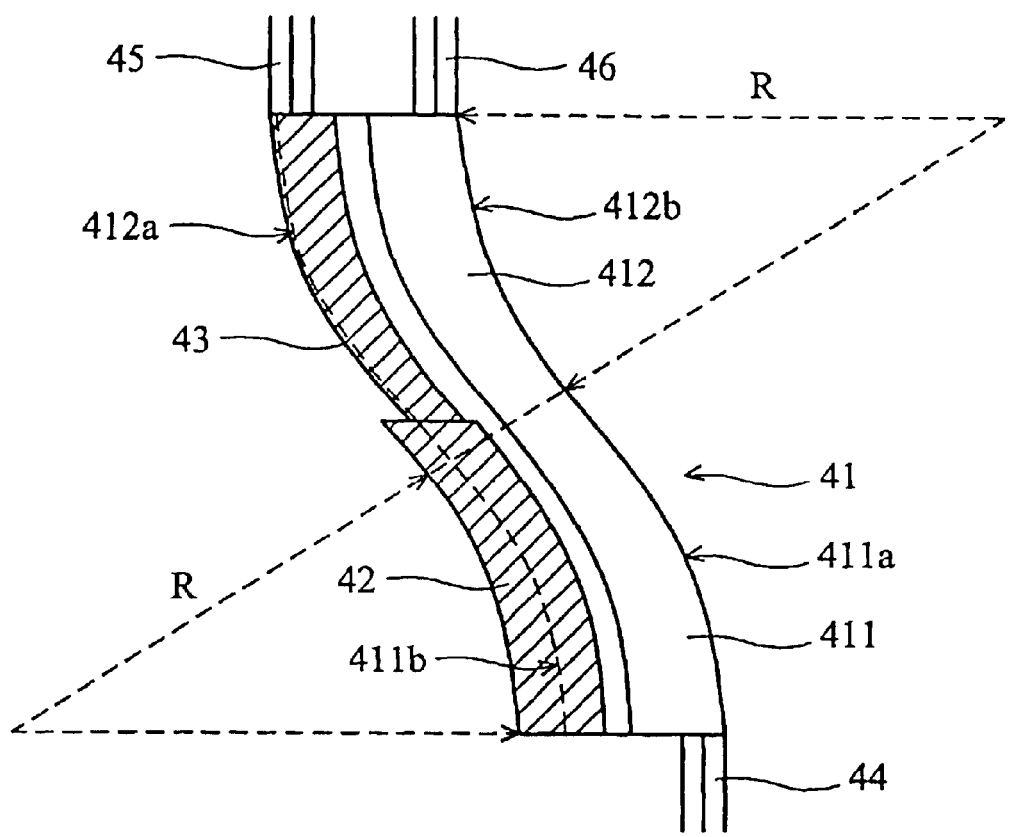
FIG. 5 schematically shows a thermo-optic wave-guide switch according to the second embodiment of the invention.

FIG. 5 schematically shows a thermo-optic wave-guide switch according to the second embodiment of the invention. As shown in FIG. 5, the thermo-optic wave-guide switch 40 of the second embodiment of the invention is a bent structure and has a multi-mode wave-guide 41, wherein the multi-mode wave-guide 41 further includes a first crooked portion 411 and a second crooked portion 412. In the second embodiment of the invention, the first crooked portion 411 has a first outer curve 411a and a first inner curve 411b with a predetermined curvature radius R, and the second crooked portion 412 has a second outer curve 412a and a second inner curve 412b with the same curvature radius R. The first crooked portion 411 connects the second crooked portion 412 whereby the first outer curve 411a connects the second inner curve 412b and the first inner curve 411b connects the second outer curve 412a. In the second embodiment of the invention, the multi-mode wave-guide 41 has a thermo-optic property such that when the temperature is increased, the index of the multi-mode wave-guide is decreased. A first thin film heater 42 is formed on the first inner curve 411b of the first crooked portion 411, and a second thin film heater 43 is formed on the second outer curve 412a of the second crooked portion 412. The thermo-optic wave-guide switch 40 of the second embodiment of the invention has an input port 44, a first output port 45 and a second output port 46. The input port 44 is located at one end of the first crooked portion 411 and is on the different side of the first thin film heater 42. The first output port 45 and the second output port 46 are located at one end of the second crooked portion 412, wherein the first output port 45 is adjacent to the second thin film heater 43 and the second output port 46 is away from the second thin film heater 43. Furthermore, the width of the first thin film heater 42 on the first crooked portion 411 is greater than the width of the second thin film heater 43 on the second crooked portion 412.

The thermo-optic wave-guide switch of the second embodiment has an S-shaped multimode region 41. In this structure, the fields of waveguide modes in the multimode region are slightly centrifugally distributed in the first curved portion 411. This results in higher coupling efficiency for lower order waveguide modes and lower coupling efficiency for higher order waveguide modes, such that less waveguide modes effectively contribute to the multimode interference process. Hence, the order of effective waveguide modes in the S-shaped multimode region is reduced, and the required length for self-imaging is shorter than those with straight structures.

In the second curved portion 412 of the S-shape multi-mode region 41, the fields of waveguide modes are slightly centrifugally distributed opposite to those in the first curved part 411. Crosstalk in this structure can be reduced because less fields propagate into the second output port 46, such that the range of operating wavelength can be increased.

Figure 6A:
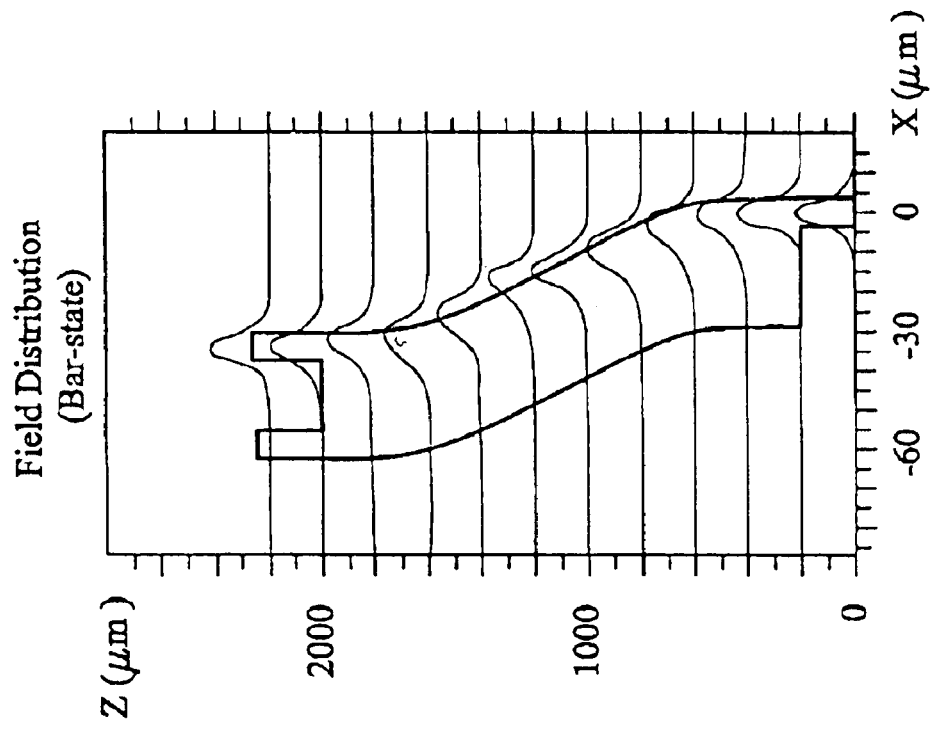
FIG. 6A schematically shows the first operation of the thermo-optic wave-guide switch, wherein the thermo-optic wave-guide switch is unheated by the thin film heater.

FIG. 6A schematically shows the first operation of the thermo-optic wave-guide switch, wherein the thermo-optic wave-guide switch is unheated by the thin film heater. As shown in FIG. 6A, when the thin film heater does not heat the thermo-optic wave-guide switch and a signal $\Psi$ with the wavelength $\lambda_o$ enters the input port, the first output port outputs the signal in a cross state.

Figure 6B:
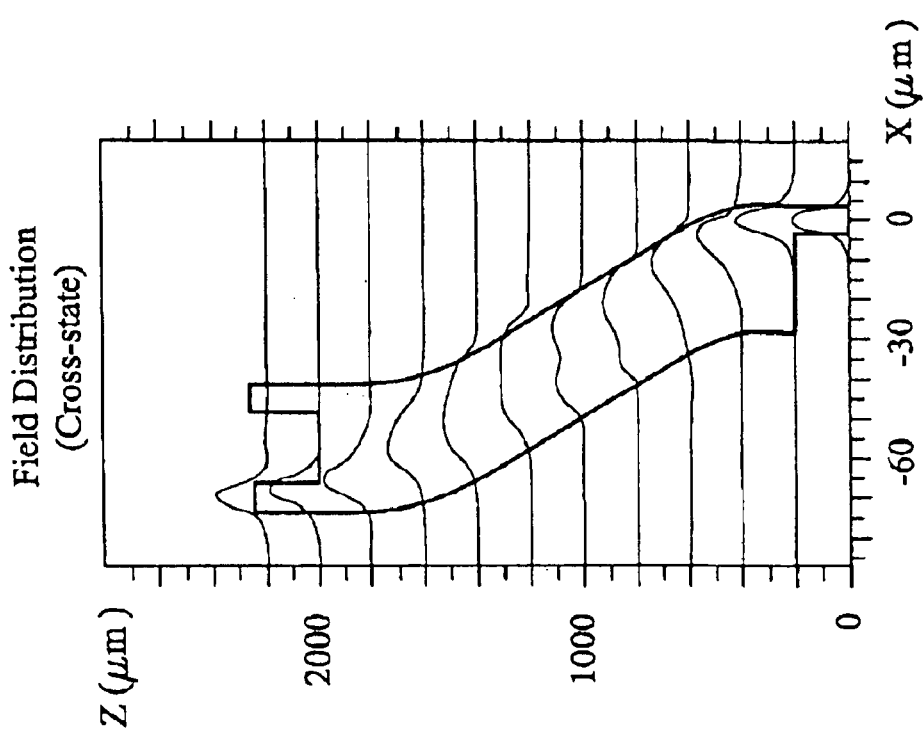
FIG. 6B schematically shows the second operation of the thermo-optic wave-guide switch, wherein the thermo-optic wave-guide switch is heated by the thin film heater.

FIG. 6B schematically shows the second operation of the thermo-optic wave-guide switch, wherein the thermo-optic wave-guide switch is heated by the thin film heater. As shown in FIG. 6B, when the thin film heater heats the thermo-optic wave-guide switch and a signal $\Psi$ with the wavelength $\lambda_o$ enters the input port, the second output port outputs the signal in a bar state.

In conclusion, when the input port, the first output port and the second output port of the thermo-optic wave-guide switch respectively connect with three single-mode waveguides, the multi-mode wave-guide switch controls the optical path of the signal by the thin film heater. Thus, the thermo-optic wave-guide switch selectively switches the optical path of the signal.

Figure 7A:
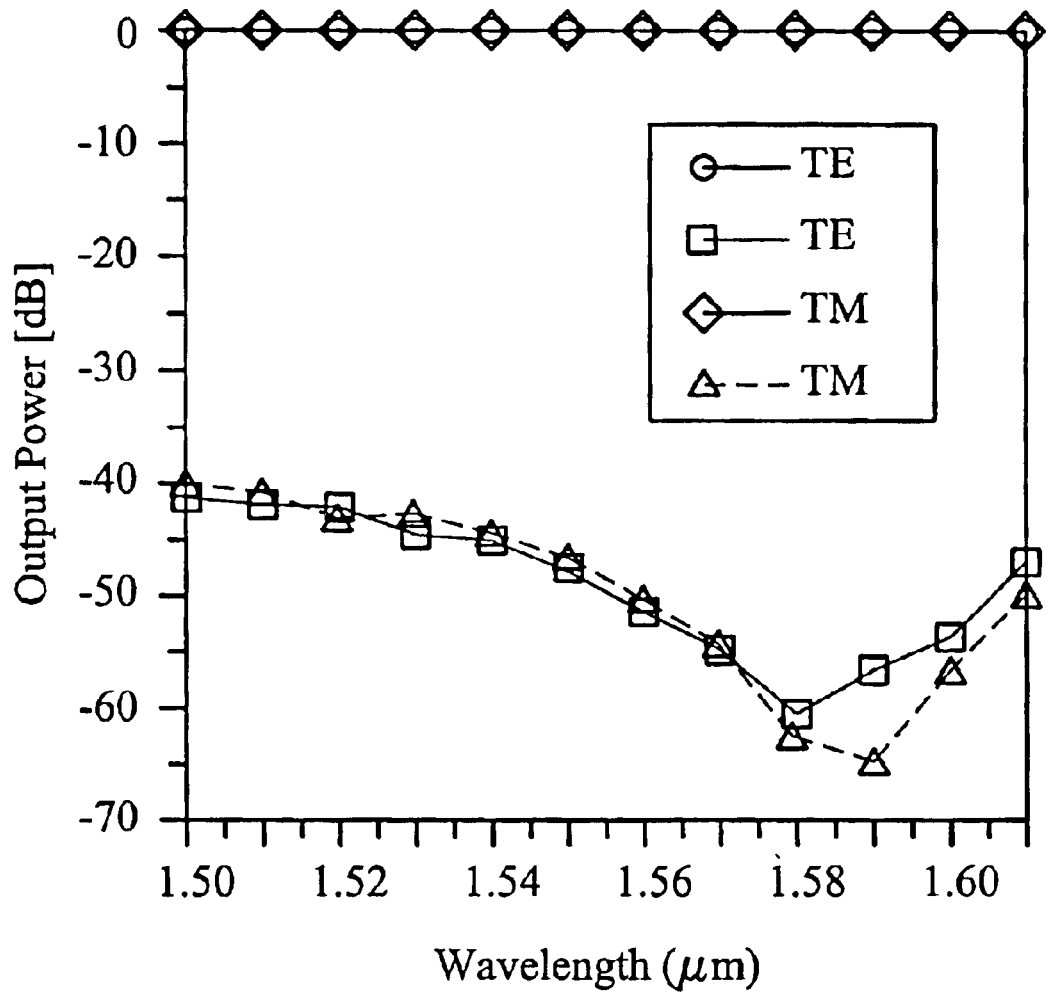
FIG. 7A schematically shows the output intensity of the thermo-optic wave-guide switch in the second embodiment of the invention in an unheated state.

FIG. 7A schematically shows the output intensity of the thermo-optic wave-guide switch in the second embodiment of the invention in an unheated state. The symbol ○ represents an output intensity of a TE-mode signal at the first output port, and the symbol ◇ represents an output intensity of a TM-mode signal at the first output port. The symbol □ represents an output intensity of a TE-mode signal at the second output port, and the symbol Δ represents an output intensity of a TM-mode signal at the second output port. As shown in FIG. 7A, when the first and second thin film heaters do not provide the multi-mode wave-guide with heat, the TE-mode signal and the TM-mode signal are output from the first output port according to the self-image theorem. The output intensities of the TE-mode signal and the TM-mode signal between 1530 nm and 1610 nm at the second output port are less than −40 dB. Thus, when the first and second thin film heaters do not provide the multi-mode wave-guide with heat, the signal received by the thermo-optic wave-guide switch is output from the first output port thereof.

Figure 7B:
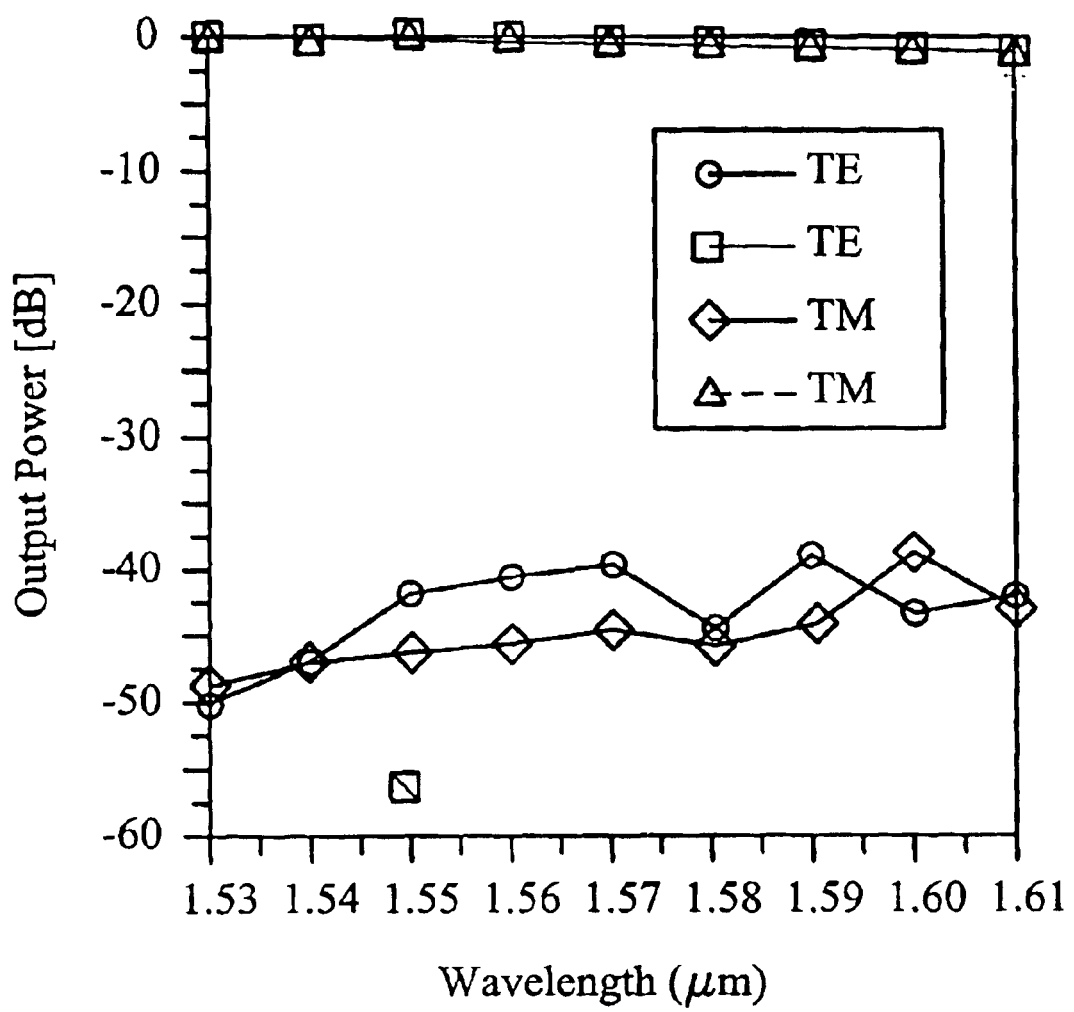
FIG. 7B schematically shows the output intensity of the thermo-optic wave-guide switch in the second embodiment of the invention in a heated state.

FIG. 7B schematically shows the output intensity of the thermo-optic wave-guide switch in the second embodiment of the invention in a heated state. The symbol ○ represents an output intensity of a TE-mode signal at the first output port, and the symbol ◇ represents an output intensity of a TM-mode signal at the first output port. The symbol □ represents an output intensity of a TE-mode signal at the second output port, and the symbol Δ represents an output intensity of a TM-mode signal at the second output port. As shown in FIG. 7B, when the first and second thin film heaters provide the multi-mode wave-guide with heat, the TE-mode signal and the TM-mode signal are output from the second output port. The output intensities of the TE-mode signal and the TM-mode signal between 1530 nm and 1610 nm at the first output port are less than −40 dB. Thus, when the first and second thin film heaters provide the multi-mode wave-guide with heat, the signal received by the thermo-optic wave-guide switch is output from the second output port thereof.

Figure 8:
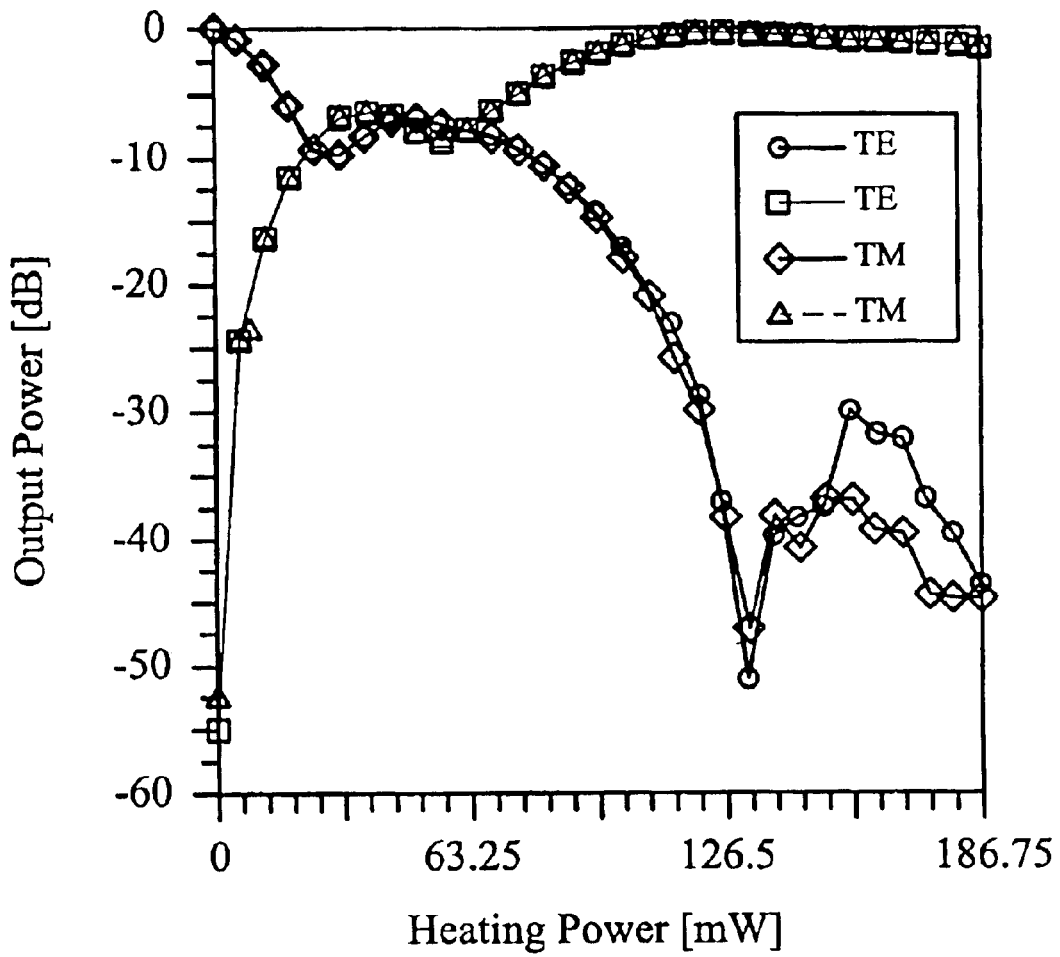
FIG. 8 schematically shows the relationship between the heat power and the output intensity in the thermo-optic wave-guide switch according to the second embodiment of the invention.

FIG. 8 schematically shows the relationship between the heat power and the output intensity in the thermo-optic wave-guide switch according to the second embodiment of the invention. The symbol ○ represents an output intensity of a TE-mode signal at the first output port, and the symbol ◇ represents an output intensity of a TM-mode signal at the first output port. The symbol □ represents an output intensity of a TE-mode signal at the second output port, and the symbol Δ represents an output intensity of a TM-mode signal at the second output port. As shown in FIG. 8, when the first and second thin film heaters provide the thermo-optic wave-guide switch with the power of 120 mW, the output intensities of the TE-mode signal and the TM-mode signal at the first output port are less than −40 dB.

Figure 9A:
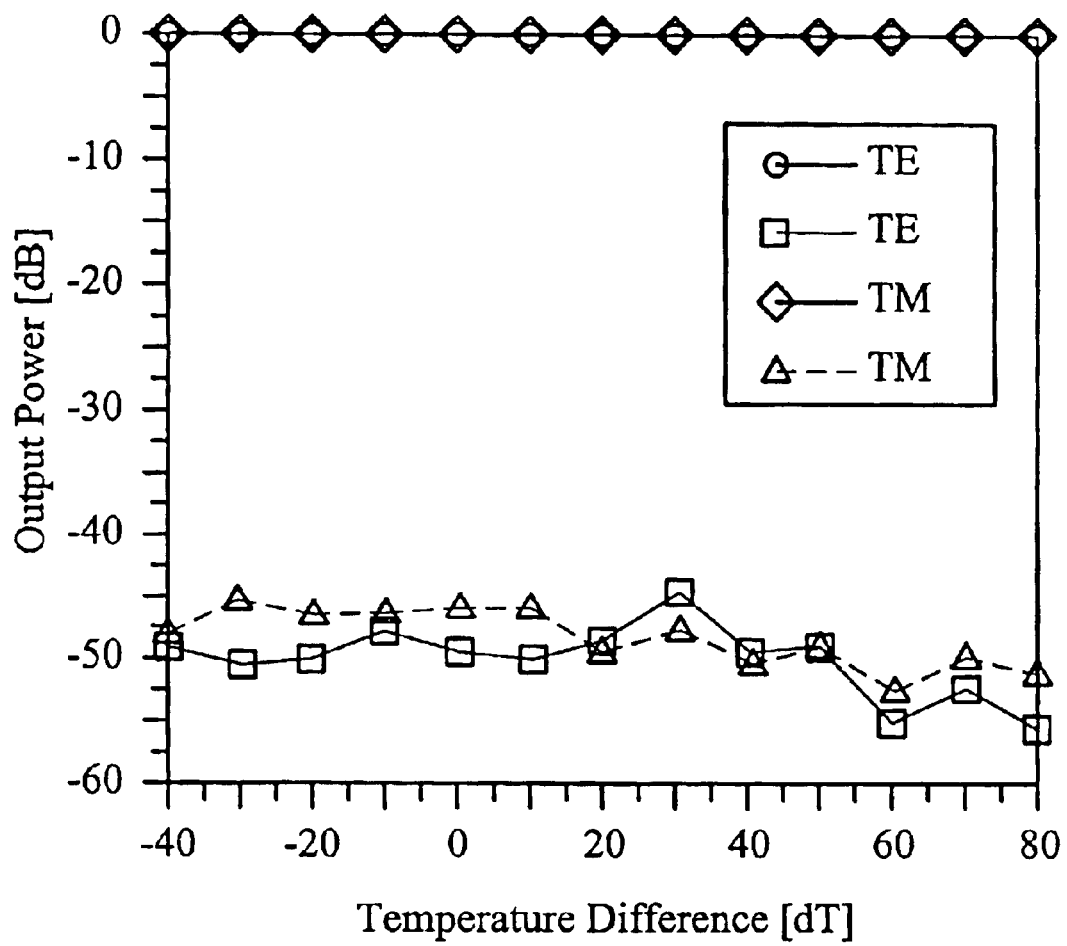
FIG. 9A illustrates the influence of the ambient temperature on the output characteristic of the thermo-optic waveguide switch according to the second embodiment of the invention in an unheated state.

FIG. 9A illustrates the influence of the ambient temperature on the output characteristic of the thermo-optic wave-guide switch according to the second embodiment of the invention in an unheated state. The symbol ○ represents an output intensity of a TE-mode signal at the first output port, and the symbol ◇ represents an output intensity of a TM-mode signal at the first output port. The symbol □ represents an output intensity of a TE-mode signal at the second output port, and the symbol Δ represents an output intensity of a TM-mode signal at the second output port. As shown in FIG. 9A, the variation in the ambient temperature does not affect the switch operation of the thermo-optic wave-guide switch in an unheated condition.

Figure 9B:
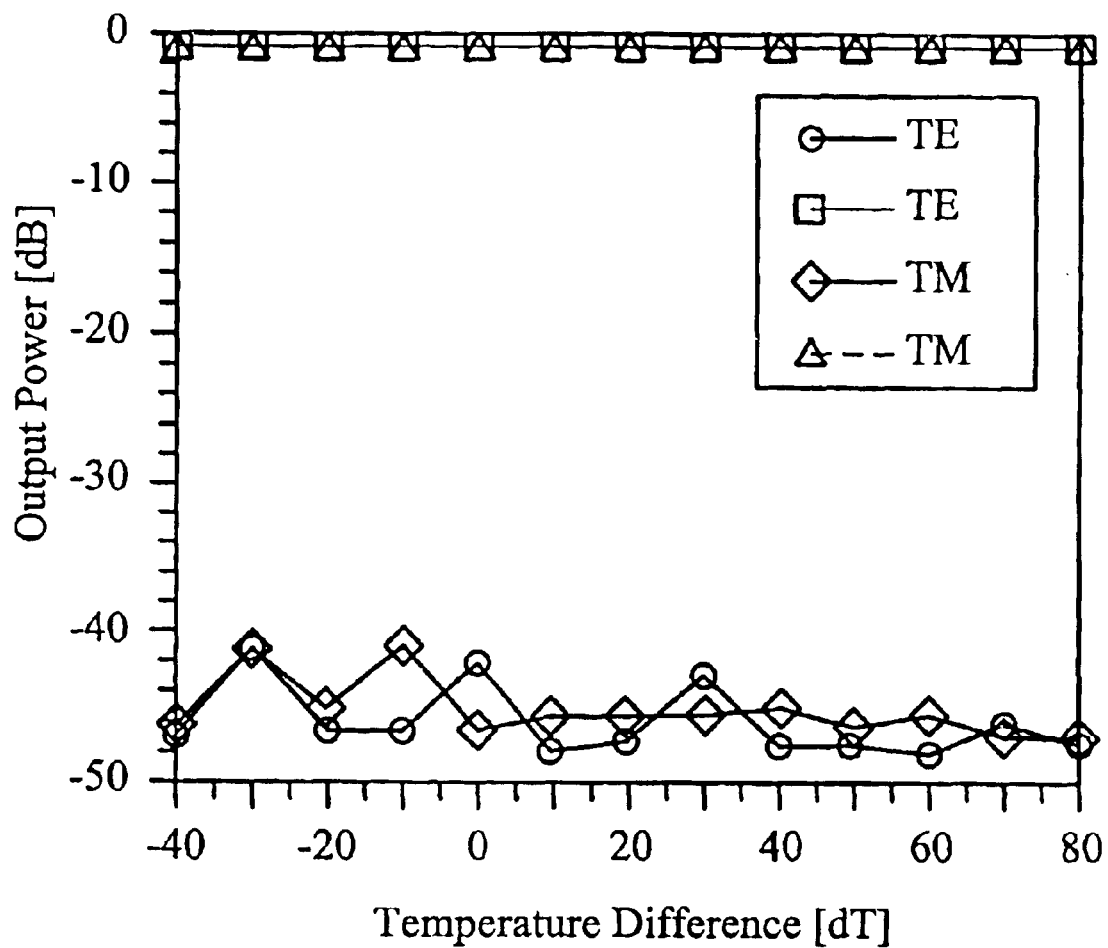
FIG. 9B illustrates the influence of the ambient temperature on the output characteristic of the thermo-optic wave-guide switch according to the second embodiment of the invention in a heated state.

FIG. 9B illustrates the influence of the ambient temperature on the output characteristic of the thermo-optic wave-guide switch according to the second embodiment of the invention in a heated state. The symbol ○ represents an output intensity of a TE-mode signal at the first output port, and the symbol ◇ represents an output intensity of a TM-mode signal at the first output port. The symbol □ represents an output intensity of a TE-mode signal at the second output port, and the symbol Δ represents an output intensity of a TM-mode signal at the second output port. As shown in FIG. 9B, the variation in the ambient temperature does not affect the switch operation of the thermo-optic wave-guide switch in a heated condition.

Figure 10:
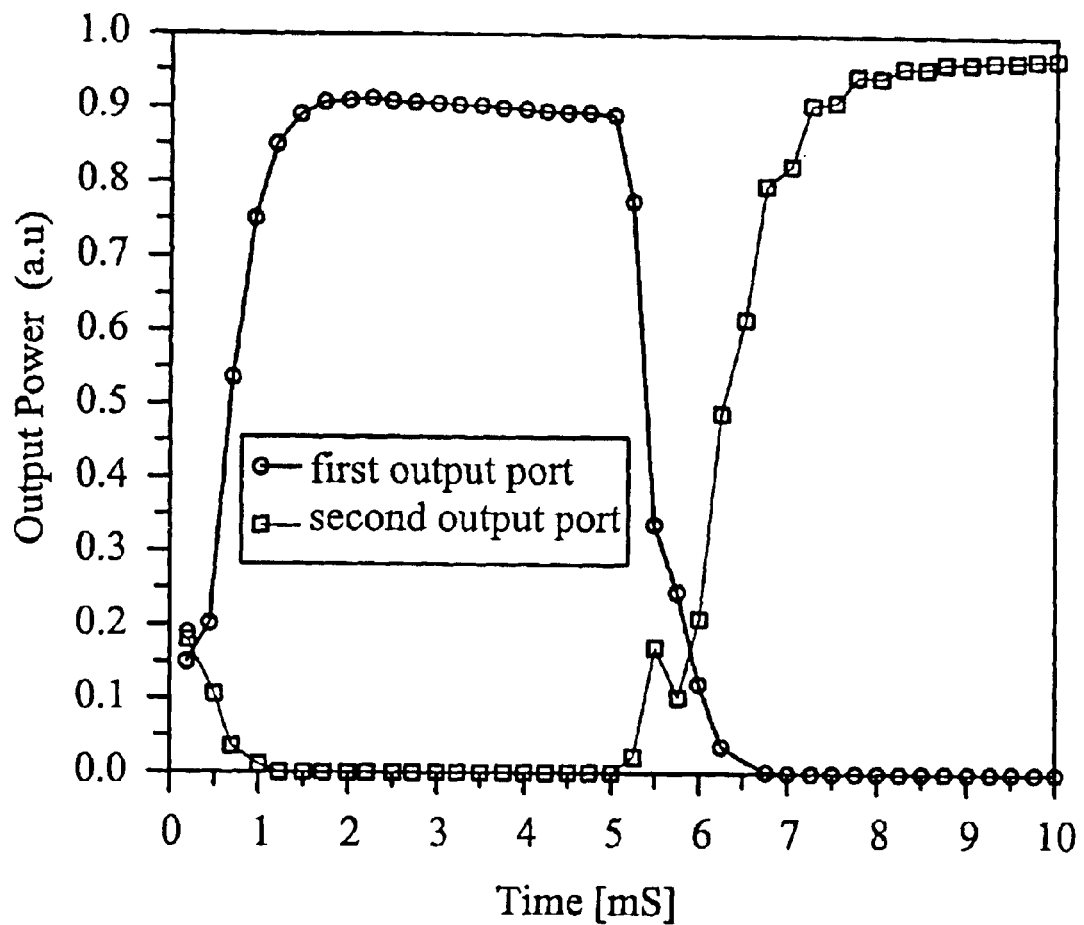
FIG. 10 schematically shows switch response time of the thermo-optic wave-guide switch according to the second embodiment of the invention.

FIG. 10 schematically shows switch response time of the thermo-optic wave-guide switch according to the second embodiment of the invention. As shown in FIG. 10, the response time for switching on the thermo-optic wave-guide switch is about 4 ms.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. A thermo-optic wave-guide switch comprising:

a multi-mode wave-guide including an input port, a first output port, and a second output port, wherein the input port is located at one end of the multi-mode waveguide, the first and second output ports are located at the other end of the multi-mode wave-guide, and the input port is shifted from the first output and the second output in an identical lateral direction of the multi-mode wave-guide, the multi-mode wave-guide further comprising:

a first crooked portion having a first outer curve and a first inner curve, wherein the input Port is located at one end of the first crooked portion and adjacent to the first outer curve, and a second crooked portion jointing the first crooked portion and having a second outer curve and a second inner curve, wherein the first output port is located at one end of the second crooked portion and adjacent to the second outer curve, and the second output port is located at one end of the second crooked portion and adjacent to the second inner curve; wherein the first outer curve connects the second inner curve, and the first inner curve connects the second outer curve; and a thin film heater formed on one side of the multi-mode wave-guide, whereby when the thin film heater does not provide the multi-mode wave-guide with heat and a signal is received by the input port, the first output port outputs the signal in the cross state, and when the thin film heater provides the multi-mode wave-guide with heat and a signal is received by the input port, the second output port outputs the signal in the bar state.

2. A thermo-optic wave-guide switch as claimed in claim 1, wherein the thin film heater is formed on the first inner curve of the first crooked portion and the second outer curve of the second crooked portion respectively.

3. A thermo-optic wave-guide switch as claimed in claim 2, wherein the width of the thin film heater formed on the first inner curve of the first crooked portion is greater than the width of the thin film heater formed on the second outer curve of the second crooked portion.

4. A thermo-optic wave-guide switch comprising:

a multi-mode wave-guide including a first crooked portion with an input port and a jointing second crooked portion with a first output port and a second output port, the input port being located at a first end of the first crooked portion, the first and second output ports being located at a first end of the second crooked portion, a second end of the first crooked portion contacting a second end of the jointing second crooked portion; and a thin film heater formed on one side of the multi-mode wave-guide, whereby when the thin film heater does not provide the multi-mode wave-guide with heat and a signal is received by the input port, the first output port outputs the signal in a cross state, and when the thin film heater provides the multi-mode wave-guide with heat and a signal is received by the input port, the second output port outputs the signal in a bar state.

5. A thermo-optic wave-guide switch as claimed in claim 4, wherein a point of inflection is provided at the contact between the first crooked portion and the second crooked portion.

6. A thermo-optic wave-guide switch comprising:

a multi-mode wave-guide including a first crooked portion having a first outer curve, a first inner curve and an input port, wherein the input port is located at one end of the first crooked portion and adjacent to the first outer curve; and a second crooked portion jointing the first crooked portion and having a second outer curve, a second inner curve, a first output port, and a second output port, wherein the first output port is located at one end of the second crooked portion and adjacent to the second outer curve, the second output port is located at one end of the second crooked portion and adjacent to the second inner curve, the first outer curve connects the second inner curve, and the first inner curve connects the second outer curve; and a thin film heater formed on the first inner curve of the first crooked portion and the second outer curve of the second crooked portion respectively;

whereby when the thin film heater does not provide the multi-mode wave-guide with heat and a signal is received by the input port, the first output port outputs the signal in a cross state, and when the thin film heater provides the multi-mode wave-guide with heat and a signal is received by the input port, the second output port outputs the signal in a bar state.

7. A thermo-optic wave-guide switch as claimed in claim 6, wherein the width of the thin film heater formed on the first inner curve of the first crooked portion is greater than the width of the thin film heater formed on the second outer curve of the second crooked portion.

* * * * *